June 8, 1954  J. H. HAYES  2,680,575
FISHING REEL

Filed June 30, 1953  4 Sheets-Sheet 1

INVENTOR
JAMES H. HAYES
BY
Curtis, Morris + Safford
ATTORNEYS

June 8, 1954  J. H. HAYES  2,680,575
FISHING REEL
Filed June 30, 1953
4 Sheets-Sheet 2

INVENTOR
JAMES H. HAYES
BY
Curtis, Morris & Safford
ATTORNEYS

June 8, 1954          J. H. HAYES          2,680,575
FISHING REEL
Filed June 30, 1953          4 Sheets-Sheet 3
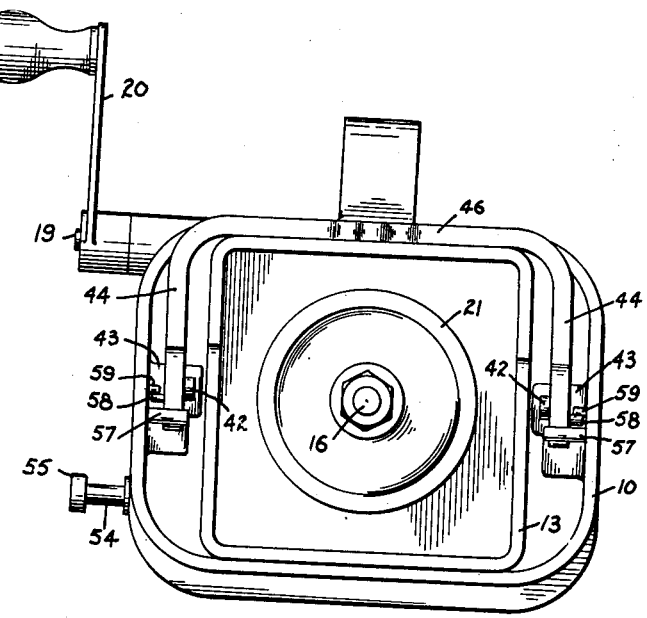
INVENTOR
JAMES H. HAYES
BY
Curtis, Morris & Safford
ATTORNEYS June 8, 1954 J. H. HAYES 2,680,575
FISHING REEL
Filed June 30, 1953 4 Sheets-Sheet 4
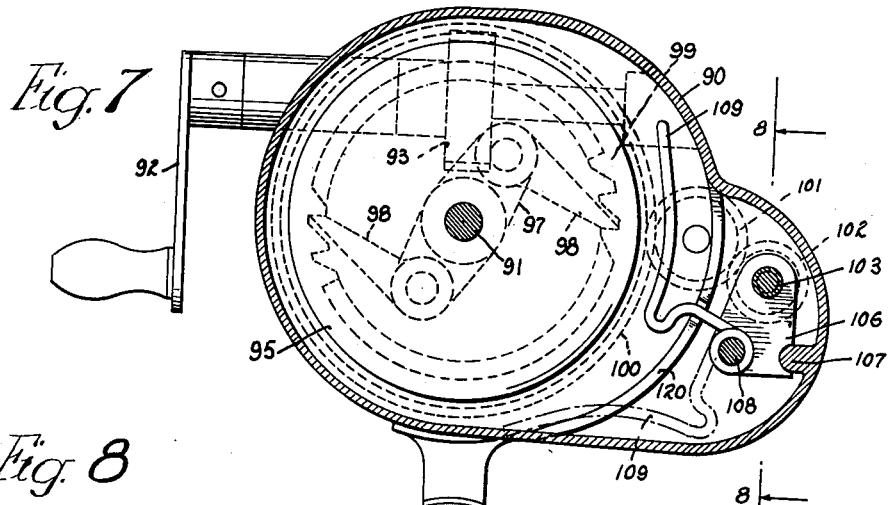
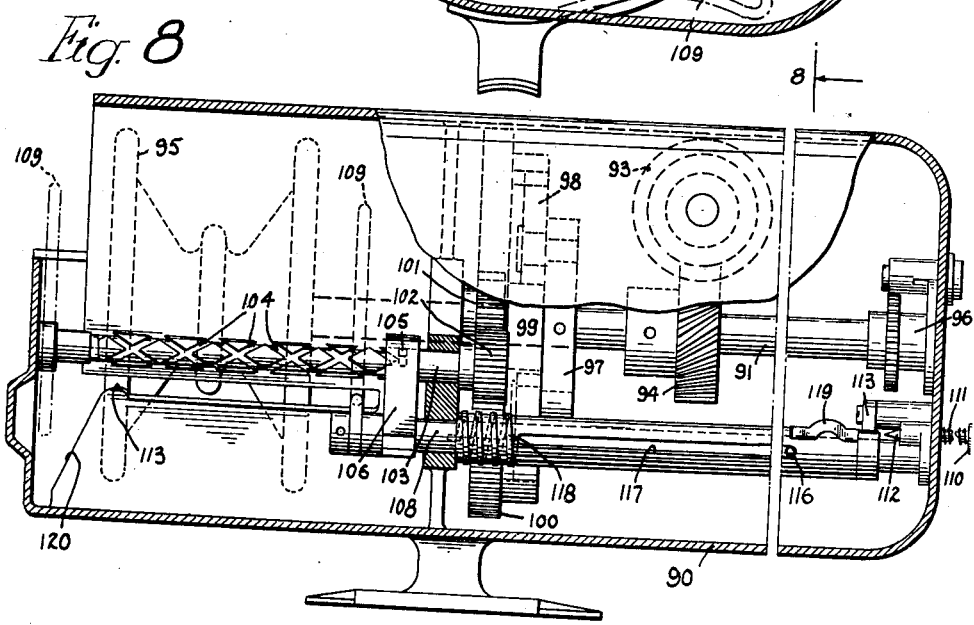
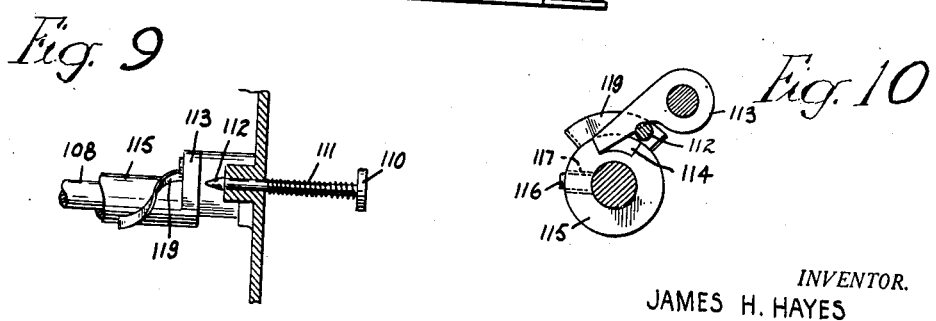
INVENTOR.
JAMES H. HAYES
BY Curtis, Morris & Safford
ATTORNEYS Patented June 8, 1954

2,680,575

UNITED STATES PATENT OFFICE 2,680,575

FISHING REEL

James H. Hayes, Yonkers, N. Y.

Application June 30, 1953, Serial No. 365,098

13 Claims. (Cl. 242—84.4)

This invention relates to fishing reels of the type wherein the line pays out generally axially of the spool, and is a continuation-in-part of the application of James H. Hayes, Serial No. 583,729, filed March 20, 1945, now abandoned.

The principal object of the invention resides in the provision of novel line handling apparatus for winding line about a spool. To this end there is provided mechanism which is simple in structure, easily operable and highly efficient in winding fishing line.

A specific object of the invention is to provide an improved line guide for a fishing reel and simplified operating devices therefor whereby the guide may speedily engage and disengage the line whenever it is desired to reel or cast.

A further object of the invention resides in the provision of novel mechanism for effecting the traverse of the line guide across a rotating space and devices for automatically swinging the line guide into an inactive position, so that the spool and line are free for casting purposes.

A still further object is to provide a structure whereby the line guide may be brought quickly from inactive to active position by the simple turning of the spool winding handle or knob.

Another object resides in the provision of a line guide and control means therefor comprising an eccentric whose stroke determines the extent of reciprocation of the line guide and manual means for automatically changing the eccentricity of the movement to carry the line guide to an inactive position.

A further object is to provide a spool of improved design on which the line will be more satisfactorily wound.

In carrying out the invention, the novel reel is supported through an attaching bracket by means of which it may be secured to a rod, said bracket carrying a housing for the driving mechanism. The latter may include a chain of gears one of which is attached to a shaft extending laterally through the housing and carrying a crank handle for driving the chain of gears, which drives a spool supporting shaft positioned with its axis parallel to the rod.

From the chain of gears a unidirectional pawl and ratchet drive operates a crank mechanism to reciprocate a line guide alongside the spool, so that as the spool revolves the guide lays the line thereon with a spiral pattern determined by the relative rate of reciprocation of the guide with respect to the rate of turning of the spool.

In casting, the line is designed to be fed freely from the spool and, as a preliminary, a button is provided to disable the crank mechanism and swing the guide out of the path of the line. Thereafter, rotation of the crank handle will automatically swing the guide back into line engaging position by restoring the disabled crank mechanism.

Other objects of the invention will be pointed out in the following description and claims and illustrated in the accompanying drawings, which disclose, by way of example, the principle of the invention and the best mode, which has been contemplated, of applying that principle.

In the drawings:

Figure 6 is an end view of the reel looking from the right at Figure 2;

Figure 7 is a sectional elevation of a further form of the invention;

Figure 8 is a sectional view taken on lines 8—8 of Figure 7.

Figure 9 is a detail of parts shown in Figure 8; and

Figure 10 is a further detail of the parts shown in Figure 9.

Figure 1:
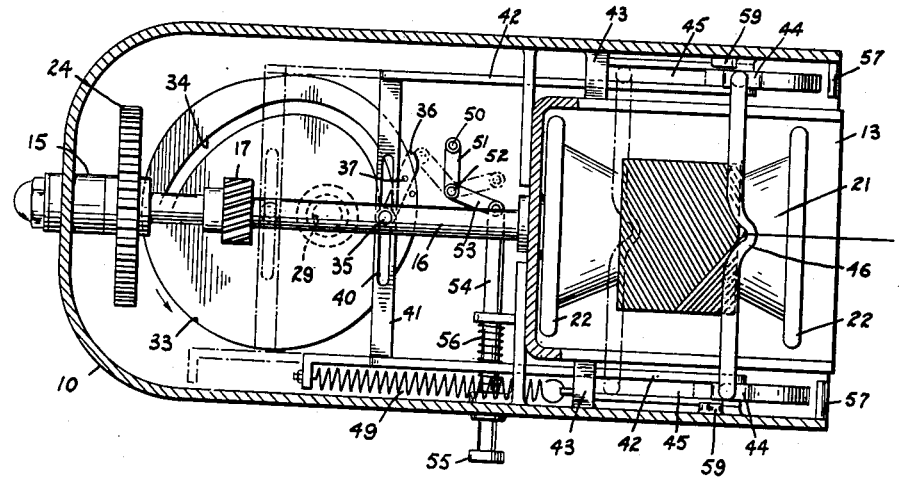
Figure 1 is a plan section taken on lines 1—1 of Figure 2, showing the crank mechanism for reciprocating the line guide.

Referring to the embodiment of Figures 1 through 6, the main frame or casting 10 is provided with a post 11 (Figure 2) of conventional design whereby the casting may be detachably secured to a fishing rod 12 in accordance with well known methods now employed in securing reels on the usual type of reel seat with which the standard rod is customarily equipped. Welded or otherwise secured to frame 10 is a subframe 13 having a bearing 14. Frame 10 has a bearing 15 in axial alignment with bearing 14 and spool rod 16 is suitably supported by these bearings for free rotation therein.

Secured to rod 16 is a helical gear 17 meshing with gear 18 on a rod 19, the outer end of which is provided with a handle 20, whereby the parts may be rotated. The right hand end of rod 16 (Figures 1 and 2) has keyed thereto spool 21 of double conical formation with end flanges 22 and a smaller central ring 23. Clockwise rotation of handle 20 (as viewed in Figure 2) will rotate spool 21 clockwise (as viewed in Figure 6), and as indicated by the arrow on shaft 16 in Figure 2.

Figure 2:
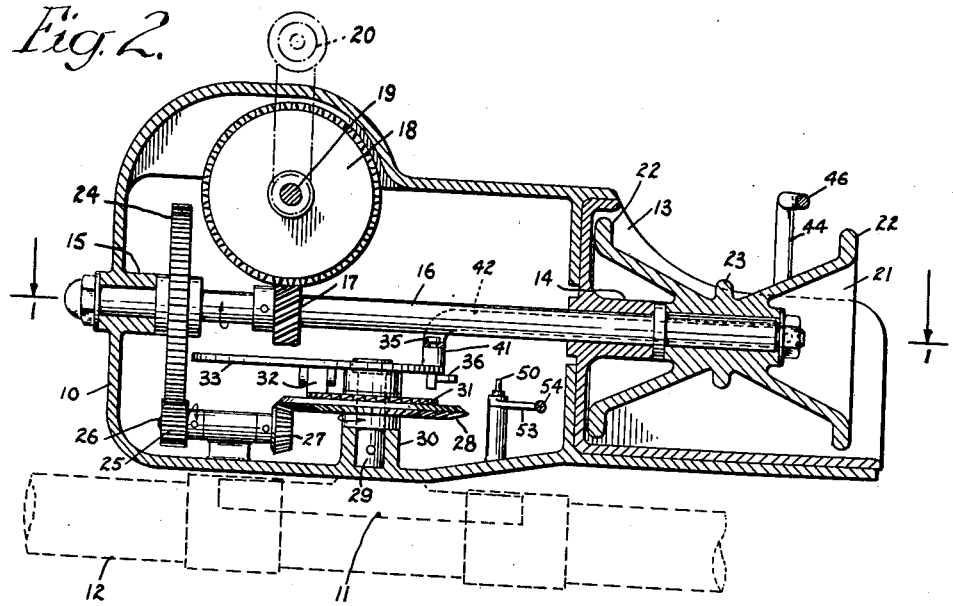
Figure 2 is a sectional elevation showing the drive connections for the spool.
Figure 5:
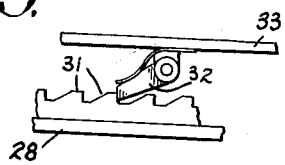
Figure 5 is a detail of the pawl and ratchet connection, the view being taken on lines 5—5 of Figure 4.

Secured to the left end of rod 16 is a gear 24 which, through pinion 25, rod 26 and bevel pinion 27, rotates a bevel gear 28 in the direction of the arrow shown in Figure 2 about a stud 29 secured in a boss 30 of frame 10. The upper surface of gear 28 is provided with ratchet teeth 31 for engagement with a spring pressed pawl 32 pivoted to the underside of a cam 33. This cam is freely rotatable on stud 29 and when gear 28 is driven in the direction indicated by the arrow in Figure 2, cam 33 will be driven therewith through the ratchet connection in the direction of the arrow shown in Figure 1. In Figure 5 this pawl and ratchet connection is shown on an enlarged scale.

Figure 3:
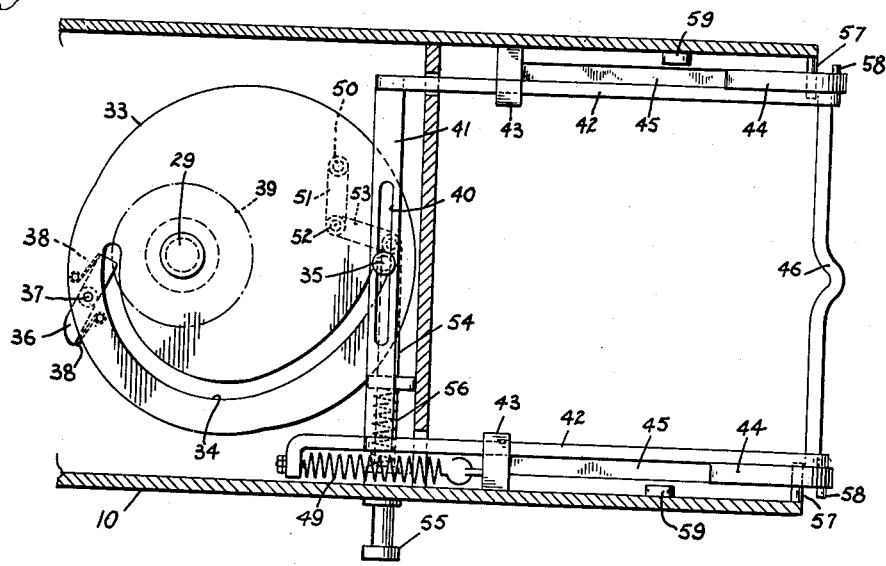
Figure 3 is an enlarged view of the line guide crank mechanism in position to permit casting.

Referring to Figure 3, cam 33 is provided with a snail shaped cam slot 34 through which a pin 35 extends. This pin is normally locked in the end of the cam slot of least radius as indicated in Figure 1, by a lever 36 which is pivoted at 37 to cam 33 and held in the position shown in Figure 3 by oppositely acting blade springs 38 carried by the cam 33.

With pin 35 so locked to cam 33, rotation of the cam will drive the pin in a circular path, whose radius is the least radius of the cam slot. This path is represented by the broken line 39 in Figure 3.

The upper end of pin 35 extends through a slot 40 in a cross arm 41 which has a pair of transverse links 42 suitably guided for horizontal reciprocation in guides 43. Accordingly, as pin 35 travels in the circular path 39, it will reciprocate cross arm 41 and its integral links 42 between the full line and the dotted line positions indicated in Figure 1.

Figure 4:
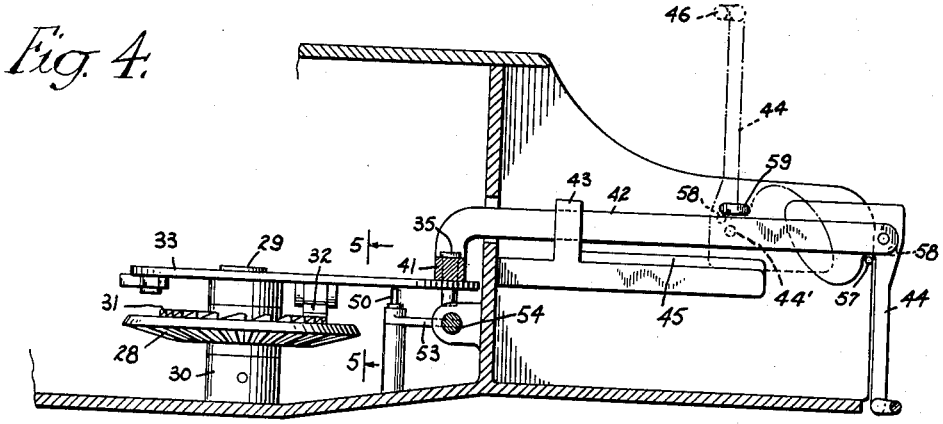
Figure 4 is an enlarged elevation of the line guide in casting position.

Pivotally connected at 44' adjacent the free end of each link 42 is an L-shaped member 44 (Figure 4) which, during the normal reciprocation of links 42, will slide back and forth in a guide slot 45 which serves to retain the member in the upright position shown in Figures 2 and 4. The two members 44 are connected by line guide 46 having a bend at its center, whereby to guide the line during reeling operations. Through the connections just traced, the line guide 46 is reciprocated between the full and dotted line positions indicated in Figure 1, with the line passing over the top of the guide onto the spool 21.

The ratio of the gearing is preferably chosen so that guide 46 makes slightly more or less than one reciprocation for each revolution of spool 21, so that as a result the line is laid on the spool with successive turns closely spaced in a helical pattern.

The central ring 23 assists greatly in properly starting the wind by guiding the line in a criss-cross pattern and preventing the line from slipping along the spool. The particular proportions of the spool shown in Figure 2 are not intended to be limitations because the central ring may be varied in size in relation to the spool.

The length of the spool of line is, of course, determined by the reciprocatory stroke of the shuttle arm 46 and by altering the size of cam 33 any desired capacity can be obtained. The device winds the line in a subsequently straight sided mass and, if desired, the end flanges 22 may be omitted.

When the fisherman is ready to cast, cam 33 is advanced to the position of Figure 1, that is, with links 42 and guide 46 in their extreme outer positions. In such position, the lever 36 on cam 33 lies in the arcuate path of a pin 50 in the end of an arm 51 pivoted at 52. This arm forms a bell crank with an arm 53 articulated with a plunger 54. By pressing button 55 inwardly, plunger 54 moves against the action of a restoring spring 56 and rocks bell cranks 51, 53 to the dotted line position of Figure 1. As a result, pin 50 engages and rocks lever 36 out of locking engagement with pin 35, so that the pin is free to move in the cam slot 34. The button 55 is pressed during the act of casting, so that pull on the line and the whip of the rod both assist in shifting the parts from their reeling to casting positions.

The lower link 42 (as viewed in Figure 1) is urged toward the right by a spring 49 whose right end is anchored to guide 43. Thus, when pin 35 is released, the tension of spring 49 will draw cross arm 41 and pin 35 to the right, and will force clockwise rotation of cam 33 from the position of Figure 1 to that of Figure 3 through the camming action of pin 35 in slot 34. This clockwise rotation of cam 33 will cause reverse movement of the pawl and ratchet drive connection, so that following release of pin 35 handle 20 is turned in reverse direction sufficiently to permit cam 33 to turn 180°.

Figure 4 shows the parts in this extreme or casting position and it is to be particularly observed that the line guide 46 lies out of the path of movement of the line as it pays off of the spool during casting and the members 44 have rocked about their pivot points on links 42 preferably through an angle of substantially 180°. This is effected as follows. As member 44 continues to the right from its normal line-guiding position shown in dotted outline, it rides out of guide slot 45 and its curved edge engages a fixed pin 57 which coacts with the curved edge to turn the member to the full line position. The curved edge terminates in a recess which partially encircles pin 57, thereby serving to lock member 44 in casting position against accidental displacement during the casting operation. On the forward swing the line is drawn from the spool in the direction of its axis, being guided in a conical path as it feeds over outer flange 22.

After the cast has been made, the parts are returned to initial reeling position by simply turning handle 20 in the reeling direction. This causes rotation of cam 33 counterclockwise as viewed in Figure 3, whereby cam slot 34 acts on pin 35 to draw the pin toward the center of the cam until it snaps behind lever 36 where it remains until again released. Incidentally, links 42 are drawn to the left and in so doing the left side of the depending arm of member 44 (Figure 4) cams itself against pin 57 to return the member to its upright position where it enters guide slot 45. A pin 58 extending inwardly from member 44 will pass under a fixed ledge 59, which serves to guide the member until it is well into the guide slot 45.

As has heretofore been pointed out, the ratio of the gearing is preferably such that the guide 46 makes slightly more or less than one reciprocation for each revolution of the spool 21, with the result that the line is laid on the spool with successive turns in helical pattern. In other words, looking at Figure 1, when the spool 21 is rotated 180° the guide 46 will travel, for instance, from its extreme right to its extreme left position and the line will be laid on the surface of the spool in a helical path for 180° of the spool. When the guide 46 moves completely from the left to the right and the spool is rotated another 180° the line will be laid on the surface of the spool in a helical path for the other 180° of the spool, and as the reciprocating movements of the guide are repeated these two 180° helical paths will be repeated so that the line will be built up on the spool as illustrated in Figure 1, and because of the difference in magnitude of the rotation of the spool and the simultaneous reciprocation of the guide, the line will be laid side by side on the spool in what will amount to substantially a cylindrical form so that when casting the line will be substantially free of any friction or otherwise stated will be laid on the spool, and therefore will pay off of the spool with no substantial resistance to its paying off. In this way, upon one reciprocation of the guide 46 and one revolution of the spool 21, the line will pass from one side of the spool to the diametrically opposite side of the spool in a helical path and then will pass from the latter side back to the former side in a helical path, thus completing the 360° winding.

Figures 7 through 10 show a modification of the invention in which a housing 90 has suitably journaled therein a shaft 91 driven by a handle 92 through gears 93 and 94. Secured to the shaft 91 is a spool 95, so that rotation of the handle is accompanied by turning of the spool. Suitable detenting wheel and dog members are provided at 96.

Secured to shaft 91 is a lever 97 carrying spring urged dogs 98 which engage in internal ratchet teeth of a member 99 loose on shaft 91. This member has external gear teeth 100 which through an idler 101 drive a gear 102 secured to a shaft 103. Thus, when shaft 91 is driven clockwise as viewed in Figure 7, shaft 103 is driven in the same direction.

Shaft 103 has a reversing thread 104 cut therein and a pin 105 in block 106 rides in the thread grooves to reciprocate blocks 106 as the shaft turns. Block 106 embraces a rail 107 (Figure 7) and also straddles a rod 108, so as to reciprocate the rod therewith but leaving the rod free to turn in the block.

At the left end of rod 108 is secured line guide 109 which reciprocates to guide the line on the spool 95 as the latter is rotated.

When it is desired to cast, line guide 109 is moved to its extreme left hand position as indicated in Figure 8 and button 110 is pressed against the action of its spring 111. The button pushes the tapered end of a plunger 112 beneath a dog 113 to raise the latter out of a notch 114 in sleeve 115. This sleeve serves as a guide for rod 108, which latter has a pin 116 riding in a slot 117 of the sleeve. During reeling operations sleeve 115 is biased by a spring 118 against dog 113 to maintain slot 117 in the positions shown in Figures 8 and 10, where it prevents shaft 108 from turning.

When, however, button 110 is operated, dog 113 is removed and spring 118 will turn the sleeve clockwise as viewed in Figure 10. This turning is aided and rendered positive by the engagement of the end of plunger 112 with a cam surface 119, so that line guide 109 is thereby rocked to the dotted line position of Figure 7.

To restore the parts to reeling position, it is simply necessary to rotate handle 92 which will result in drawing line guide 109 to the right as viewed in Figure 8 and as the guide so moves its camming surface adjacent the rod 108 will engage the camming surface 120 which is stationary with the frame 90, and as a result it will be rocked thereby back to its original position. As it passes over hump 113, it rocks a little beyond the full line position of Figure 10 and thereby rocks its shaft 108 and pin 116 and also sleeve 115 enough to insure that dog 113 will snap back into latching engagement with notch 114.

While there have been shown and described and pointed out the fundamental novel features of the invention as applied to two embodiments, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. A fishing reel comprising a spool, a line guide having a line engaging loop therein movable back and forth along one side of the spool, actuating means for the guide operable to reciprocate it in a line between predetermined limits, manually operable means for controlling the movement of the guide to permit it to travel various distances in one direction, means for moving the guide through the greater of said distances and camming devices effective upon the travel of said guide for said greater distance for shifting the guide to move the loop therein out of line engaging position.

2. A fishing reel comprising a spool, a line guide movable back and forth along one side of the spool, actuating means for the guide operable to reciprocate it in a line between predetermined limits, manually operable means for controlling the movement of the guide to permit it to travel various distances in one direction, means for moving the guide through the greater of said distances and camming devices effective upon the travel of said guide for said greater distance for shifting the guide out of line of engaging position.

3. The invention set forth in claim 2 in which the line guide reciprocating means comprises a drive shaft, a pin rotatable therewith and located eccentrically with respect thereto and the manually operable means includes devices for increasing the eccentricity of the pin with respect to the shaft.

4. The invention set forth in claim 2 in which the line guide reciprocating means comprises a drive shaft, a member thereon having a cam slot therein varying in its distance from the shaft, a pin in said slot connected to the line guide, a latch normally holding the pin in the slot at its point of least distance from the shaft to move the pin in a circle of predetermined extent, and the manually operable means includes devices for actuating said latch to release the pin for movement in the cam slot to a point at a greater distance from the shaft.

5. In a fishing reel, a frame, a shaft mounted within said frame, a spool secured to said shaft, a reciprocable line guide mounted on said frame for reciprocation in the direction of the axis of said spool, a rotatable disk mounted within said frame and having a slot therein extending increasing distances from the center of rotation of said disk, a pin connected with said line guide and extending into and operable in said slot, means for releasably locking said pin in said slot at the point where the slot is closest to the center of rotation of the disk, means for releasing said pin, and means for rotating said disk and said spool.

6. In a fishing reel, a frame, a shaft mounted within said frame, a spool secured to said shaft, a reciprocable line guide mounted on said frame for reciprocation in the direction of the axis of said spool, a rotatable disk mounted within said frame and having a slot therein extending increasing distances from the center of rotation of said disk, a pin connected with said line guide and extending into and operable in said slot, means for releasably locking said pin in said slot at the point where the slot is closest to the center of rotation of the disk, means for releasing said pin, means for rotating said disk and said spool, and means for actuating said last-mentioned means.

7. In a fishing reel, a frame, a shaft mounted within said frame, a spool secured to said shaft, a reciprocable line guide mounted on said frame for reciprocation in the direction of the axis of said spool, a rotatable disk mounted within said frame and having a slot therein extending increasing distances from the center of rotation of said disk, a pin connected with said line guide and extending into and operable in said slot, means for releasably locking said pin in said slot at the point where the slot is closest to the center of rotation of the disk, means for releasing said pin, means for rotating said disk and said spool, means for actuating said last-mentioned means, said first-mentioned means including a gear permanently connected to said shaft, and a train of gears releasably connected to said disk.

8. In a fishing reel, a frame, a shaft mounted within said frame, a spool secured to said shaft, a reciprocable line guide mounted on said frame for reciprocation in the direction of the axis of said spool, a rotatable disk mounted within said frame and having a slot therein extending increasing distances from the center of rotation of said disk, a pin connected with said line guide and extending into and operable in said slot, means for releasably locking said pin in said slot at the point where the slot is closest to the center of rotation of the disk, means for releasing said pin, means for rotating said disk and said spool, means for actuating said last-mentioned means, said first-mentioned means including a gear permanently connected to said shaft, and a train of gears releasably connected to said disk, said train of gears having a dog and ratchet connection to said disk to permit said disk to rotate freely in one direction independently of the train of gears and to rotate with said train of gears in the opposite direction.

9. In a fishing reel, a frame, a shaft mounted within said frame, a spool secured to said shaft, a reciprocable line guide mounted on said frame for reciprocation in the direction of the axis of said spool, a rotatable disk mounted within said frame and having a slot therein extending increasing distances from the center of rotation of said disk, a pin connected with said line guide and extending into and operable in said slot, means for releasably locking said pin in said slot at the point where the slot is closest to the center of rotation of the disk, means for releasing said pin, means for rotating said disk and said spool, means for actuating said last-mentioned means, said first-mentioned means including a gear permanently connected to said shaft, a train of gears releasably connected to said disk, said train of gears having a dog and ratchet connection to said disk to permit said disk to rotate freely in one direction independently of the train of gears and to rotate with said train of gears in the opposite direction, means for releasing said dog from said ratchet, and automatic means connected to and operable through said guide to move said guide in one direction to rotate said disk to cause said pin to advance in said slot from the point thereof closest to the center of rotation of said disk toward the opposite end of said slot.

10. In a fishing reel, a frame, a shaft mounted within said frame, a spool secured to said shaft, a reciprocable line guide mounted on said frame for reciprocation in the direction of the axis of said spool, a rotatable disk mounted within said frame and having a slot therein extending increasing distances from the center of rotation of said disk, a pin connected with said line guide and extending into and operable in said slot, means for releasably locking said pin in said slot at the point where the slot is closest to the center of rotation of the disk, means for releasing said pin, means for rotating said disk and said spool, means for actuating said last-mentioned means, said first-mentioned means including a gear permanently connected to said shaft, a train of gears releasably connected to said disk, said train of gears having a dog and ratchet connection to said disk to permit said disk to rotate freely in one direction independently of the train of gears and to rotate with said train of gears in the opposite direction, means for releasing said dog from said ratchet, automatic means connected to and operable through said guide to move said guide in one direction to rotate said disk to cause said pin to advance in said slot from the point thereof closest to the center of rotation of said disk toward the opposite end of said slot, said guide having an articulated portion adapted to swing over the end of the spool upon the aforesaid traversing movement of said pin within said slot, and means for causing such swinging movement of said articulated portion upon the release of said pin by its locking means.

11. A fishing reel comprising a spool, a line guide having a line engaging portion movable back and forth along one side of the spool, actuating means for the guide operable to reciprocate it in a line between predetermined limits, manually operable means for controlling the movement of the guide to permit it to travel various distances in one direction, means for moving the guide through the greater of said distances, and means effective upon the travel of said guide for said greater distance for shifting the guide to move the line engaging portion thereof out of line engaging position, said line guide being pivotally mounted and the shifting means including a cam operative to move said guide pivotally out of line-engaging position during a movement of reciprocation of said guide.

12. In a fishing reel, a spool shaft, a line receiving spool mounted on said shaft, means for rotating said spool, said spool comprising a pair of coaxial truncated conical surfaces having their portions of least diameter adjacent each other and joined together, means for feeding a single fishing line to said surfaces of said spool in a direction substantially normal to the axes of said truncated conical surfaces progressively longitudinal of the axes of said truncated conical surfaces successively in both longitudinal directions upon rotation of said spool in one direction, said line feeding means comprising a reciprocable member reciprocable in a line substantially parallel to the axes of said truncated conical surfaces and said spool rotating means being constructed and arranged to impart one complete revolution to the spool while said reciprocable member travels a distance at variance with a complete reciprocation substantially equal to the diameter of the line being wound upon the spool whereby the line is wound upon the frustro conical surfaces of the spool in a helical path and is built in a substantially cylindrical manner having its axis substantially coincident with those of the frustro conical surfaces.

13. The combination of elements recited in claim 12 wherein an annular line starting enlargement is interposed between the adjacent ends of said frustro conical surfaces.

References Cited in the file of this patent

UNITED STATES PATENTS

| Number | Name | Date |
|---|---|---|
| 817,987 | Richardson | Apr. 17, 1906 |
| 905,329 | Krause et al. | Dec. 1, 1908 |
| 1,521,229 | Clickner | Dec. 30, 1924 |
| 1,755,195 | Stanley | Apr. 22, 1930 |
| 2,251,782 | Coxe | Aug. 5, 1941 |
| 2,314,616 | Gaire | Mar. 23, 1943 |
| 2,344,132 | Coxe | Mar. 14, 1944 |
| 2,363,533 | King | Nov. 28, 1944 |
| 2,377,996 | Coleman | June 12, 1945 |
| 2,428,324 | Worden | Sept. 30, 1947 |

FOREIGN PATENTS

| Number | Country | Date |
|---|---|---|
| 15,756 | Great Britain | of 1910 |
| 22,597 | Great Britain | of 1907 |
| 363,597 | Great Britain | Dec. 24, 1931 |
| 828,000 | France | Feb. 2, 1938 |
| 878,594 | France | Oct. 19, 1942 |
| 887,877 | France | Aug. 23, 1943 |
| 61,881 | Norway | Dec. 2, 1940 |